United States Patent
Trezise et al.

(10) Patent No.: US 12,353,040 B2
(45) Date of Patent: Jul. 8, 2025

(54) ADAPTER CONFIGURED TO PERMIT A HEAT SHRINK SPLICE HOLDER PORTION OF A FIBER SPLICE CASSETTE TO HOLD A MECHANICAL CRIMP SPLICE PROTECTOR

(71) Applicant: PPC BROADBAND, INC., East Syracuse, NY (US)

(72) Inventors: Shaun Trezise, Aldeburgh (GB); Kim Leeson, Ipswich (GB); Stefan Donchev, Milton Keynes (GB)

(73) Assignee: PPC BROADBAND, INC., East Syracuse, NY (US)

( * ) Notice: Subject to any disclaimer, the term of this patent is extended or adjusted under 35 U.S.C. 154(b) by 274 days.

(21) Appl. No.: 18/133,437

(22) Filed: Apr. 11, 2023

(65) Prior Publication Data
US 2023/0324624 A1    Oct. 12, 2023

Related U.S. Application Data

(60) Provisional application No. 63/362,781, filed on Apr. 11, 2022.

(51) Int. Cl.
*G02B 6/44* (2006.01)
*G02B 6/255* (2006.01)

(52) U.S. Cl.
CPC ......... *G02B 6/4454* (2013.01); *G02B 6/2558* (2013.01)

(58) Field of Classification Search
CPC .............................. G02B 6/2558; G02B 6/4454
See application file for complete search history.

(56) References Cited

U.S. PATENT DOCUMENTS

| | | | |
|---|---|---|---|
| 5,185,845 A | 2/1993 | Jones | |
| 5,222,184 A * | 6/1993 | Foss | G02B 6/4454 385/137 |
| 5,375,185 A | 12/1994 | Hermsen et al. | |

(Continued)

FOREIGN PATENT DOCUMENTS

| | | |
|---|---|---|
| EP | 2381283 A1 | 10/2011 |
| EP | 2960698 A1 * | 12/2015 |

(Continued)

OTHER PUBLICATIONS

International Search Report and Written Opinion dated Jul. 5, 2023 in corresponding International Application No. PCT/US2023/018211, 12 pages.

*Primary Examiner* — Michael Stahl
(74) *Attorney, Agent, or Firm* — MH2 TECHNOLOGY LAW GROUP LLP

(57) ABSTRACT

An adapter configured to permit a heat shrink splice holder portion of a fiber splice cassette to hold a mechanical crimp splice protector includes a base portion and a holding portion configured to extend from the base portion The holding portion may be configured to hold a first splice protector, and the base portion may be configured to include a receiving feature that may be configured to couple the adapter with a fiber splice cassette. The receiving feature may be configured to couple the adapter with a splice protector holder portion of a fiber splice cassette that is unable to hold the first splice protector so as to convert the splice protector holder portion to a splice protector holder portion that may be configured to hold the first splice protector.

23 Claims, 10 Drawing Sheets

(56) References Cited

U.S. PATENT DOCUMENTS

| | | | |
|---|---|---|---|
| 5,530,786 A * | 6/1996 | Radliff | G02B 6/3801 |
| | | | 385/136 |
| 5,566,269 A | 10/1996 | Eberle, Jr. et al. | |
| 5,590,234 A * | 12/1996 | Pulido | G02B 6/4442 |
| | | | 385/136 |
| 5,805,758 A | 9/1998 | Kim | |
| 6,249,635 B1 * | 6/2001 | Daoud | G02B 6/4471 |
| | | | 385/59 |
| 7,113,687 B2 | 9/2006 | Womack et al. | |
| 7,200,314 B2 | 4/2007 | Womack et al. | |
| 8,380,034 B2 | 2/2013 | Fleouter et al. | |
| 11,333,841 B2 | 5/2022 | Crane et al. | |
| 2013/0243386 A1 | 9/2013 | Pimental et al. | |
| 2021/0018710 A1* | 1/2021 | Allen | G02B 6/4454 |
| 2021/0055496 A1 | 2/2021 | Allen et al. | |
| 2022/0413244 A1 | 12/2022 | Lutterkordt et al. | |

FOREIGN PATENT DOCUMENTS

| | | | |
|---|---|---|---|
| WO | WO 2009/091457 A1 * | 7/2009 | |
| WO | 2020239827 A1 | 12/2020 | |

* cited by examiner

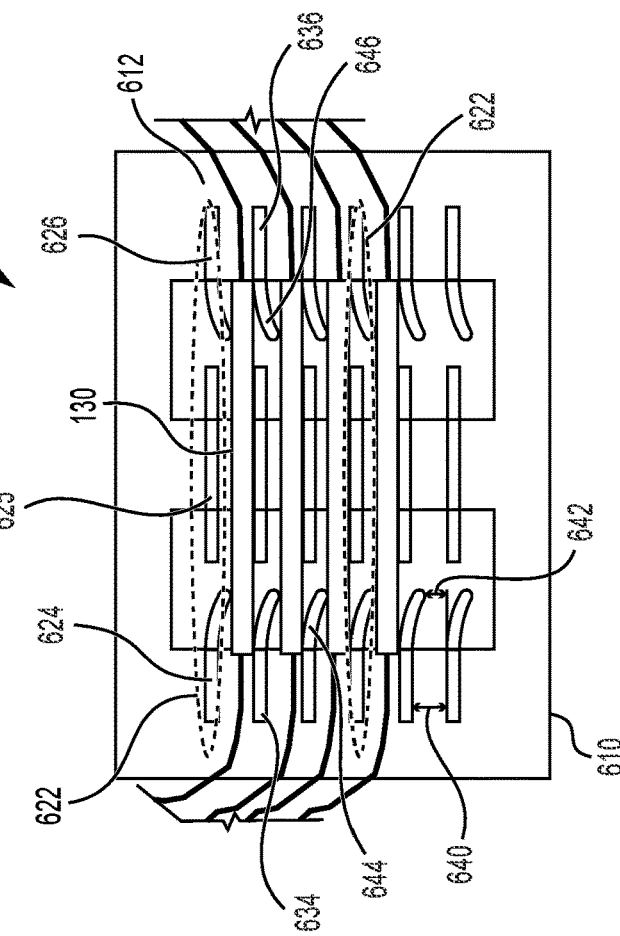
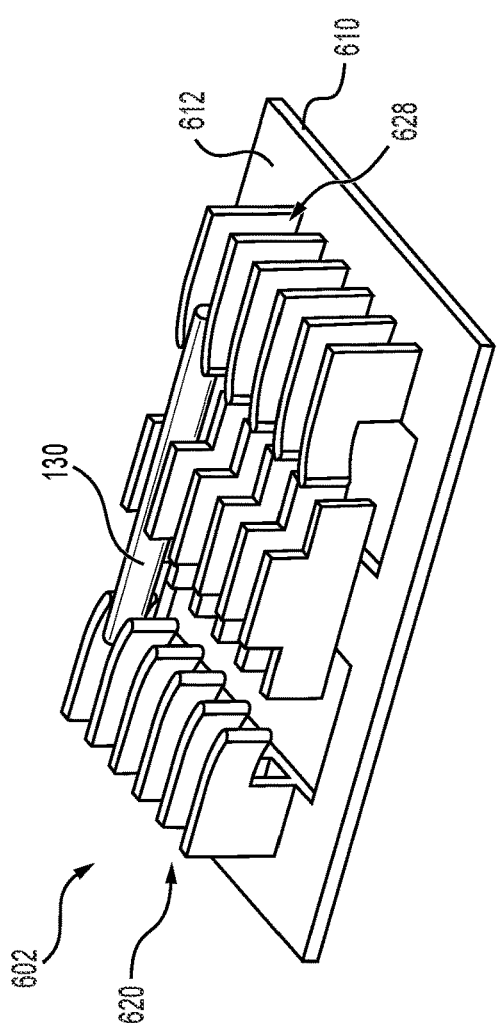

ADAPTER CONFIGURED TO PERMIT A HEAT SHRINK SPLICE HOLDER PORTION OF A FIBER SPLICE CASSETTE TO HOLD A MECHANICAL CRIMP SPLICE PROTECTOR

CROSS-REFERENCE TO RELATED APPLICATION

This application claims the benefit of U.S. Provisional Application No. 63/362,781 filed Apr. 11, 2022, the disclosure of which is hereby incorporated by reference herein in its entirety.

TECHNICAL FIELD

The present disclosure generally relates to the management of optical fiber connections and in particular concerns optical fiber organizers including fiber trays.

BACKGROUND

Optical fibers are commonly used in the telecommunication field because they are well suited to provide data transmission over long distances. Fiber cables can also carry much more bandwidth than similarly sized fiber cables and are immune to interference because there are no electrical signals in use.

In conventional fiber networking systems, optical fibers must be spliced and connected to other optical fibers at various points along the distribution path from a service provider to a customer, and therefore various systems for the management or organization of optical fibers are used to a growing extent. These systems for the management or organization of the optical fibers are typically used in central office locations and are placed into modular optical distribution frames or racks.

Conventionally, a large number of optical fibers enter the distribution frame or rack and have to be connected to other optical fibers for further transmission and/or distribution of optical signals. One way for connecting two optical fibers is by fusion splicing ends of the two fibers together, and as a result, conventional distribution frames or racks may be provided with a fiber splice cassette or fiber splice tray for managing the fiber cables and the splice. For example, the end of an individual incoming optical fiber is spliced to an individual optical fiber of a short length (e.g., a pigtail), the other end of which is already terminated with an optical connector or an optical component, such as for example, an optical splitter. In some applications, the end of an individual incoming optical fiber is spliced to an individual outgoing optical fiber. The ends of the two fibers are fusion spliced together via well-known techniques, and the fusion splice is protected by a fusion splice protector, such as a heat shrink splice protector or a mechanical crimp splice protector, and the splice protector is held at the fiber splice cassette.

Conventionally, a fiber splice cassette is provided with a fiber splice protector holder that is configured to hold a fiber splice protector. Unfortunately, heat shrink splice protectors are not the same size and shape as mechanical crimp splice protectors. For example, as shown in FIG. 3, a heat shrink splice protector 132 has a round transverse profile along its length, while a mechanical crimp splice protector 134 has a flattened transverse profile along its length, as shown in FIG. 4. As a result, heat shrink splice protector holders are not able to hold mechanical crimp splice protectors, and mechanical crimp splice protectors are not able to hold heat shrink splice protectors.

In order to solve the foregoing problem, two different fiber splice cassettes must be manufactured in order to accommodate mechanical crimp splice protectors and heat shrink splice protectors in a fiber distribution system. This increases manufacturing costs by requiring, for example, two molds, and inventory costs by requiring both types of cassettes to be stocked. Alternatively, as shown in FIGS. 1 and 2, a fiber splice cassette 110 can be made with an attachment feature that enables attachment and/or removal of different fiber splice protector holders 128', 128"—one for holding heat shrink splice protectors 128' and one for holding mechanical crimp splice protectors 128". However, this approach further increases manufacturing costs by requiring, for example, three molds (i.e., cassette and two removable holders), and inventory costs by requiring the cassette and both types of splice protector holders to be stocked. Also, the detailed structure of the attachment feature on the cassette and the holders may add to the manufacturing cost.

It may be desirable to provide an adapter configured to be coupled with a heat shrink splice holder portion of a fiber splice cassette to permit the heat shrink splice holder portion of the fiber splice cassette to hold a mechanical crimp splice protector.

SUMMARY

According to various embodiments of the disclosure, an adapter configured to permit a heat shrink splice holder portion of a fiber splice cassette to hold a mechanical crimp splice protector may include a base portion and a holding portion configured to extend from a top surface of the base portion. The holding portion may be configured to hold a mechanical crimp splice protector and to include a biasing portion configured to define a receiving portion. The receiving portion may be configured to receive a mechanical crimp splice protector. The biasing portion may be configured to hold a mechanical crimp splice protector in an interference fit and to include opposed wall portions that are biased toward one another to hold a fiber splice protector there between. The base portion may be configured to include a receiving feature that may be configured to couple the adapter with a fiber splice cassette, and the receiving feature may be configured to receive a holding portion of a fiber splice protector holder that may be configured to hold a heat shrink splice protector. The receiving feature may be configured to couple the adapter with a heat shrink splice holder portion of a fiber splice cassette that is unable to hold a mechanical crimp splice protector in an interference fit so as to convert the heat shrink splice protector holder portion to a mechanical crimp splice protector holder portion such that the fiber splice cassette may be configured to hold a mechanical crimp splice protector in an interference fit.

In some aspects of the foregoing embodiment, the receiving feature may comprise an opening through the base portion.

In some aspects of the foregoing embodiments, the receiving feature may be configured to receive a holding portion of a fiber splice protector holder that is monolithically formed with a fiber splice cassette.

According to some embodiments, an assembly configured to permit a heat shrink splice holder portion of a fiber splice cassette to hold a mechanical crimp splice protector may include the adapter of any of the foregoing embodiments, and a fiber splice cassette configured to include a monolithically formed fiber splice protector holder. The receiving feature of the adapter may be configured to receive a holding portion of the fiber splice protector holder to couple the adapter with the fiber splice cassette.

In some aspects of the foregoing embodiments, the monolithically formed fiber splice protector holder comprises a heat shrink splice protector holder portion of the fiber splice cassette.

According to various embodiments of the disclosure, an adapter configured to permit a heat shrink splice holder portion of a fiber splice cassette to hold a mechanical crimp splice protector may include a base portion and a holding portion configured to extend from the base portion. The holding portion includes a biasing portion configured to hold a first splice protector and may be configured to include a receiving feature that may be configured to couple the adapter with a fiber splice cassette. The receiving feature may be configured to receive a holding portion of a fiber splice protector holder that may be configured to hold a second splice protector that is different from the first splice protector. The receiving feature may be configured to couple the adapter with a splice protector holder portion of a fiber splice cassette that is unable to hold the first splice protector so as to convert the splice protector holder portion to a splice protector holder portion that may be configured to hold the first splice protector.

In some aspects of the foregoing embodiments, the receiving feature may be configured to couple the adapter with a splice protector holder portion of a fiber splice cassette that is unable to hold the first splice protector in an interference fit so as to convert the splice protector holder portion to a splice protector holder portion that is configured to hold the first splice protector in an interference fit.

In some aspects of the foregoing embodiments, the receiving feature may comprise an opening through the base portion.

In some aspects of the foregoing embodiments, the receiving feature may be configured to receive a holding portion of a fiber splice protector holder that is monolithically formed with a fiber splice cassette.

In some aspects of the foregoing embodiments, the biasing portion may be configured to define a receiving portion that is configured to receive a mechanical crimp splice protector.

In some aspects of the foregoing embodiments, the biasing portion may be configured to hold a mechanical crimp splice protector in an interference fit.

In some aspects of the foregoing embodiments, the biasing portion may be configured to include opposed wall portions that are biased toward one another to hold a fiber splice protector there between.

According to some embodiments, an assembly configured to permit a heat shrink splice holder portion of a fiber splice cassette to hold a mechanical crimp splice protector may include the adapter of any of the foregoing embodiments and a fiber splice cassette configured to include a fiber splice protector holder. The receiving feature of the adapter is configured to receive a holding portion of the fiber splice protector holder to couple the adapter with the fiber splice cassette.

In some aspects of the foregoing embodiments, the fiber splice protector holder may comprise a heat shrink splice protector holder portion monolithically formed with the fiber splice cassette.

According to various embodiments of the disclosure, an adapter configured to permit a heat shrink splice holder portion of a fiber splice cassette to hold a mechanical crimp splice protector may include a base portion and a holding portion configured to extend from the base portion The holding portion may be configured to hold a first splice protector, and the base portion may be configured to include a receiving feature that may be configured to couple the adapter with a fiber splice cassette. The receiving feature may be configured to couple the adapter with a splice protector holder portion of a fiber splice cassette that is unable to hold the first splice protector so as to convert the splice protector holder portion to a splice protector holder portion that may be configured to hold the first splice protector.

In some aspects of the foregoing embodiments, wherein the receiving feature is configured to couple the adapter with a splice protector holder portion of a fiber splice cassette that is unable to hold the first splice protector in an interference fit so as to convert the splice protector holder portion to a splice protector holder portion that is configured to hold the first splice protector in an interference fit.

In some aspects of the foregoing embodiments, the receiving feature may comprise an opening through the base portion.

In some aspects of the foregoing embodiments, the receiving feature may be configured to receive a holding portion of a fiber splice protector holder that is monolithically formed with a fiber splice cassette.

In some aspects of the foregoing embodiments, the holding portion may be configured to define a receiving portion that is configured to receive a mechanical crimp splice protector.

In some aspects of the foregoing embodiments, the holding portion may be configured to hold a mechanical crimp splice protector in an interference fit.

In some aspects of the foregoing embodiments, the holding portion may be configured to include opposed wall portions that are biased toward one another to hold a fiber splice protector there between.

According to some embodiments, an assembly configured to permit a heat shrink splice holder portion of a fiber splice cassette to hold a mechanical crimp splice protector may include the adapter of any of the foregoing embodiments and a fiber splice cassette configured to include a fiber splice protector holder. The receiving feature of the adapter may be configured to receive a holding portion of the fiber splice protector holder to couple the adapter with the fiber splice cassette.

In some aspects of the foregoing embodiments, the fiber splice protector holder may comprise a heat shrink splice protector holder portion monolithically formed with the fiber splice cassette.

BRIEF DESCRIPTION OF THE DRAWINGS

Further advantages and features of the present disclosure will become apparent from the following description and the accompanying drawings, to which reference is made. In which are shown:

FIG. 6A illustrates a top perspective view of a heat shrink splice protector holder portion of an exemplary fiber splice cassette.

FIG. 6B illustrates a top view of the heat shrink splice protector holder portion of FIG. 6A with heat shrink splice protectors.

DETAILED DESCRIPTION

Reference will now be made in detail to presently preferred embodiments and methods of the present disclosure, which constitute the best modes of practicing the present disclosure presently known to the inventors. It is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure. For example, specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular forms "a," "an," and "the" comprise singular and plural referents unless the context clearly indicates otherwise. For example, reference to a component in the singular is intended to comprise a singular component and/or a plurality of components.

At each point where a telecommunication cable is opened, a splice tray enclosure may be provided to protect the exposed interior of the cable. Commonly, the enclosure has one or more ports through which cables enter and/or exit the enclosure. Once inside the cassette, the cable is opened to expose the telecommunication lines therein. Conventional telecommunication enclosures are constructed to facilitate the management and protection of individual telecommunication lines and splices thereof.

Frequently, these telecommunication splice tray enclosures include fiber optic splice trays to interconnect a plurality of optical fibers.

Figure 1:
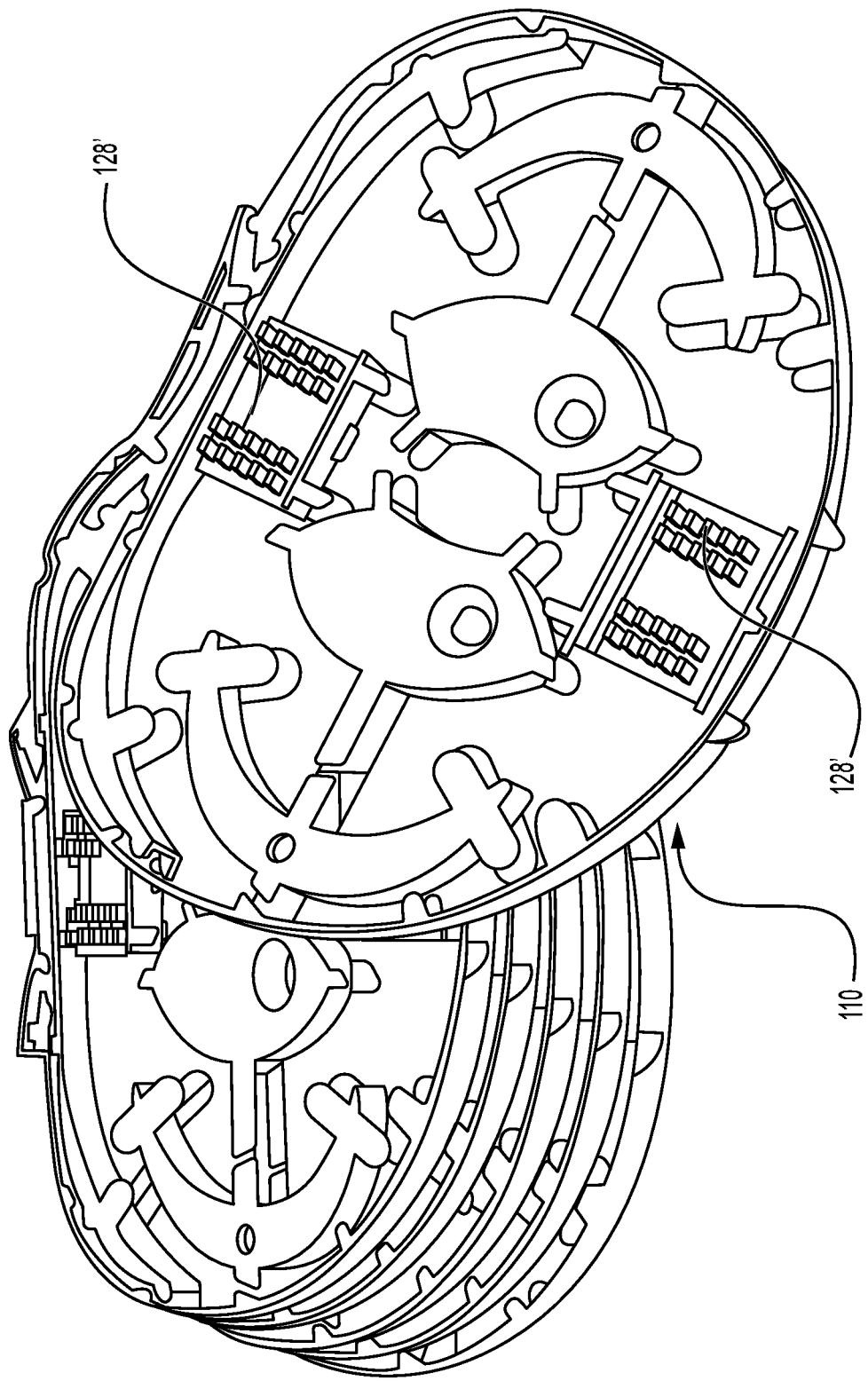
FIG. 1 illustrates a top perspective view of a conventional fiber splice cassettes having conventional removably coupled heat shrink splice protector holders.
Figure 2:
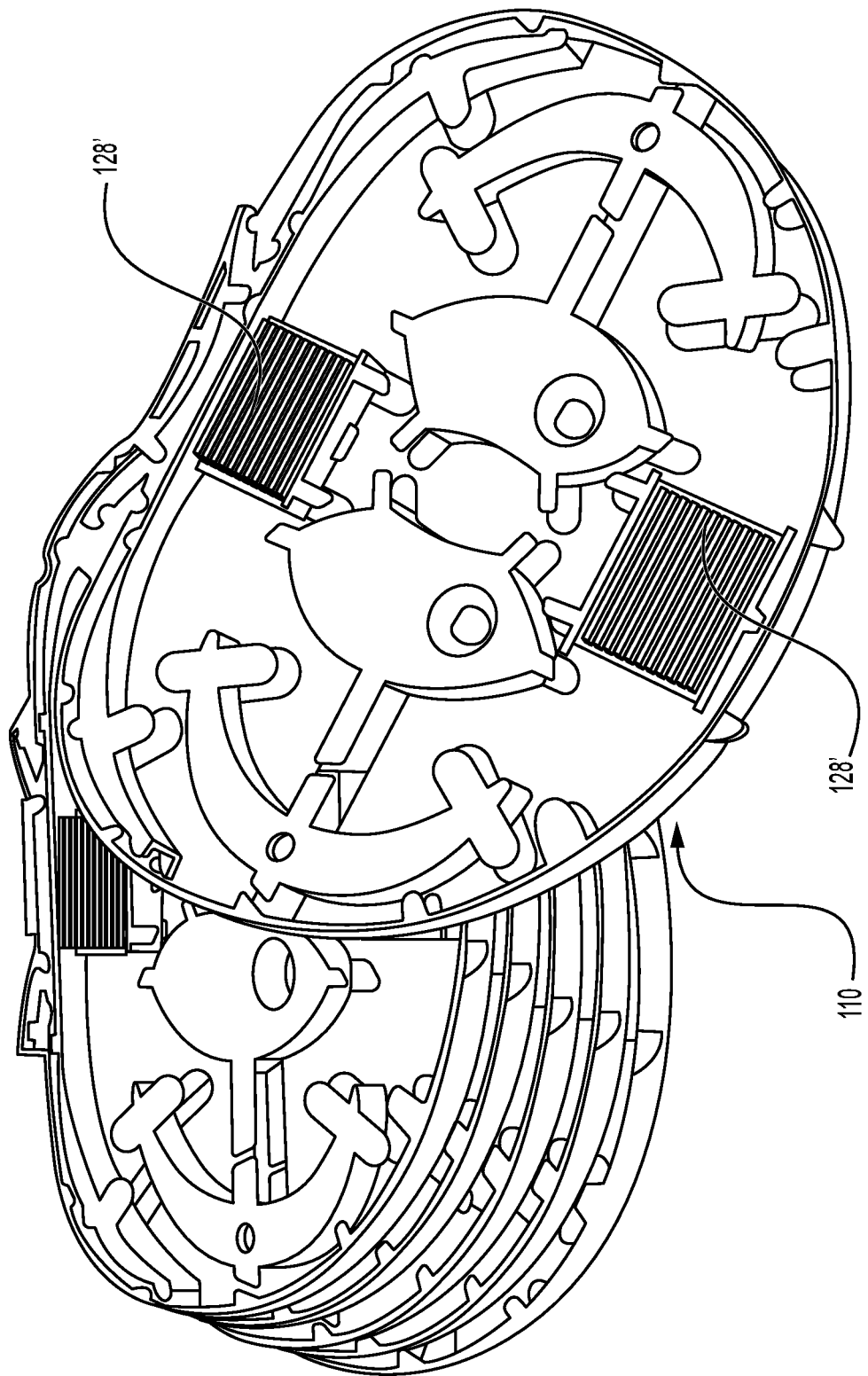
FIG. 2 illustrates a top perspective view of the conventional fiber splice cassette of FIG. 1 conventional removably coupled mechanical crimp splice protector holders.
Figure 3:
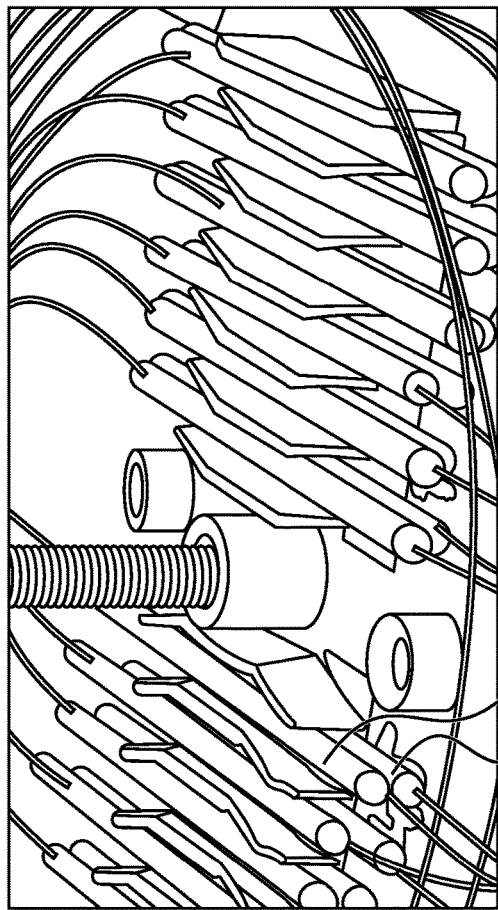
FIG. 3 illustrates a partial, enlarged view of one of the conventional heat shrink splice protector holders of FIG. 1 with heat shrink splice protectors.
Figure 4:
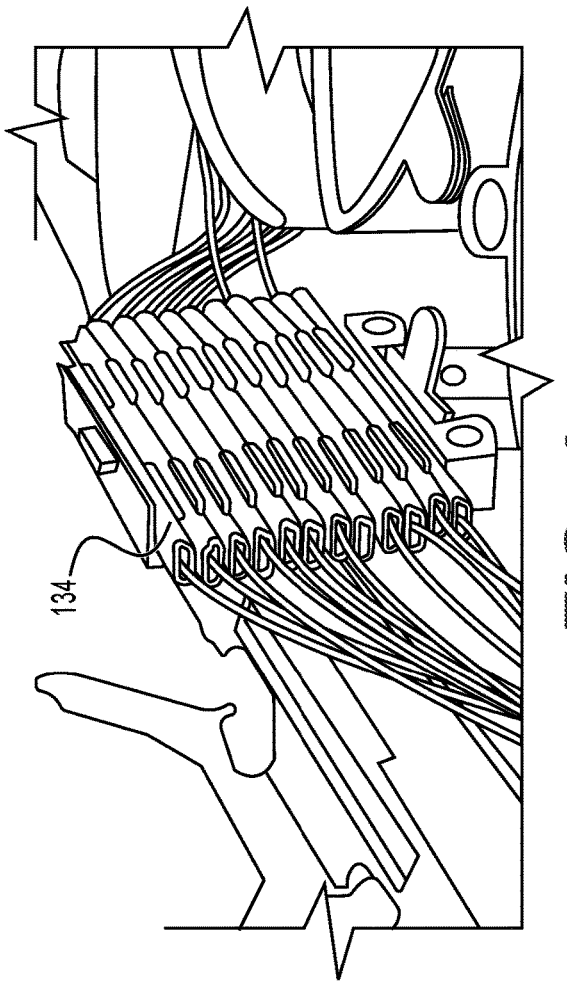
FIG. 4 illustrates a partial, enlarged view of one of the conventional mechanical crimp splice protector holders of FIG. 2 with mechanical crimp splice protectors.
Figure 5A:
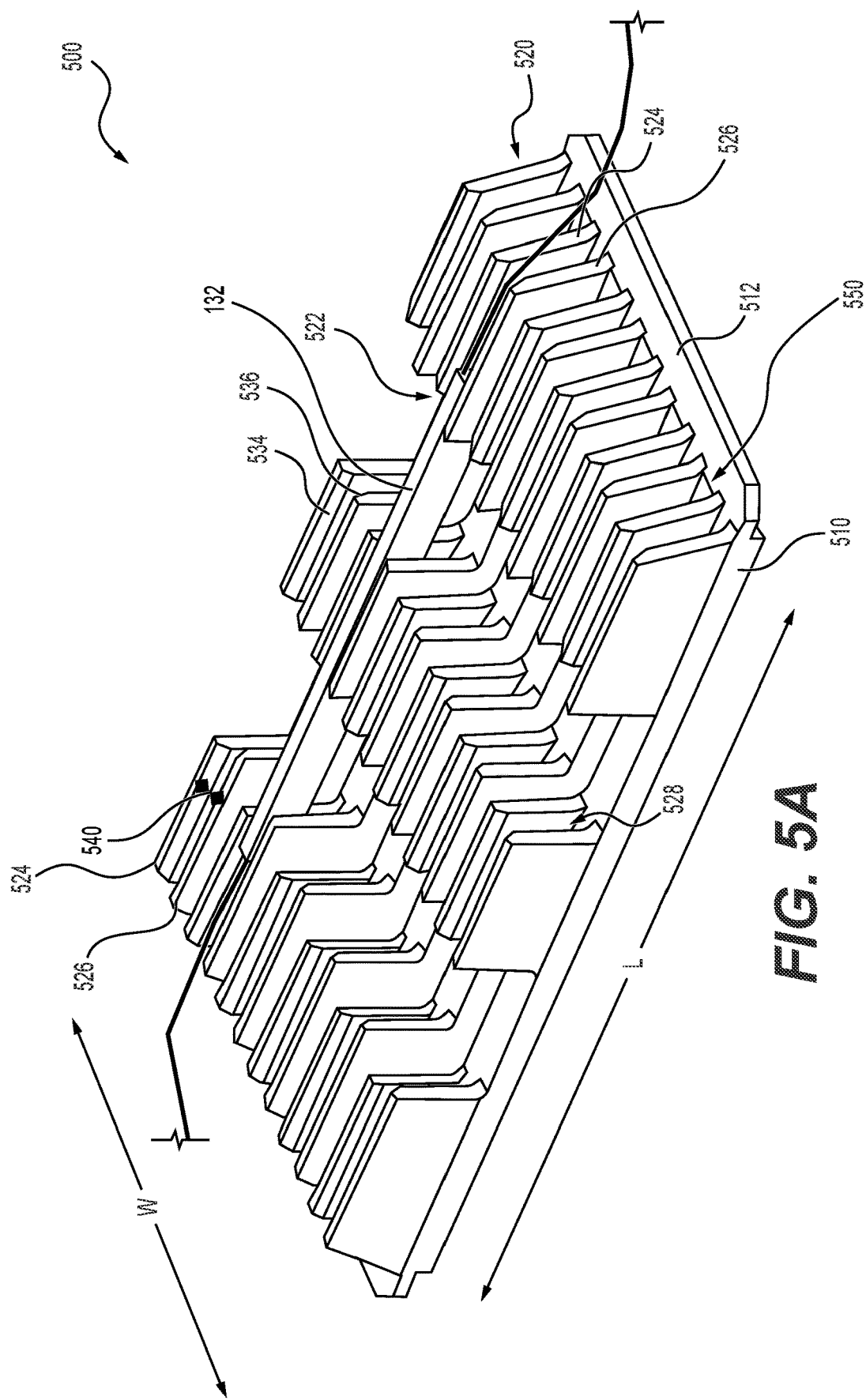
FIG. 5A illustrates a top perspective view of an exemplary fiber splice holder adapter in accordance with various aspects of the disclosure.
Figure 5B:
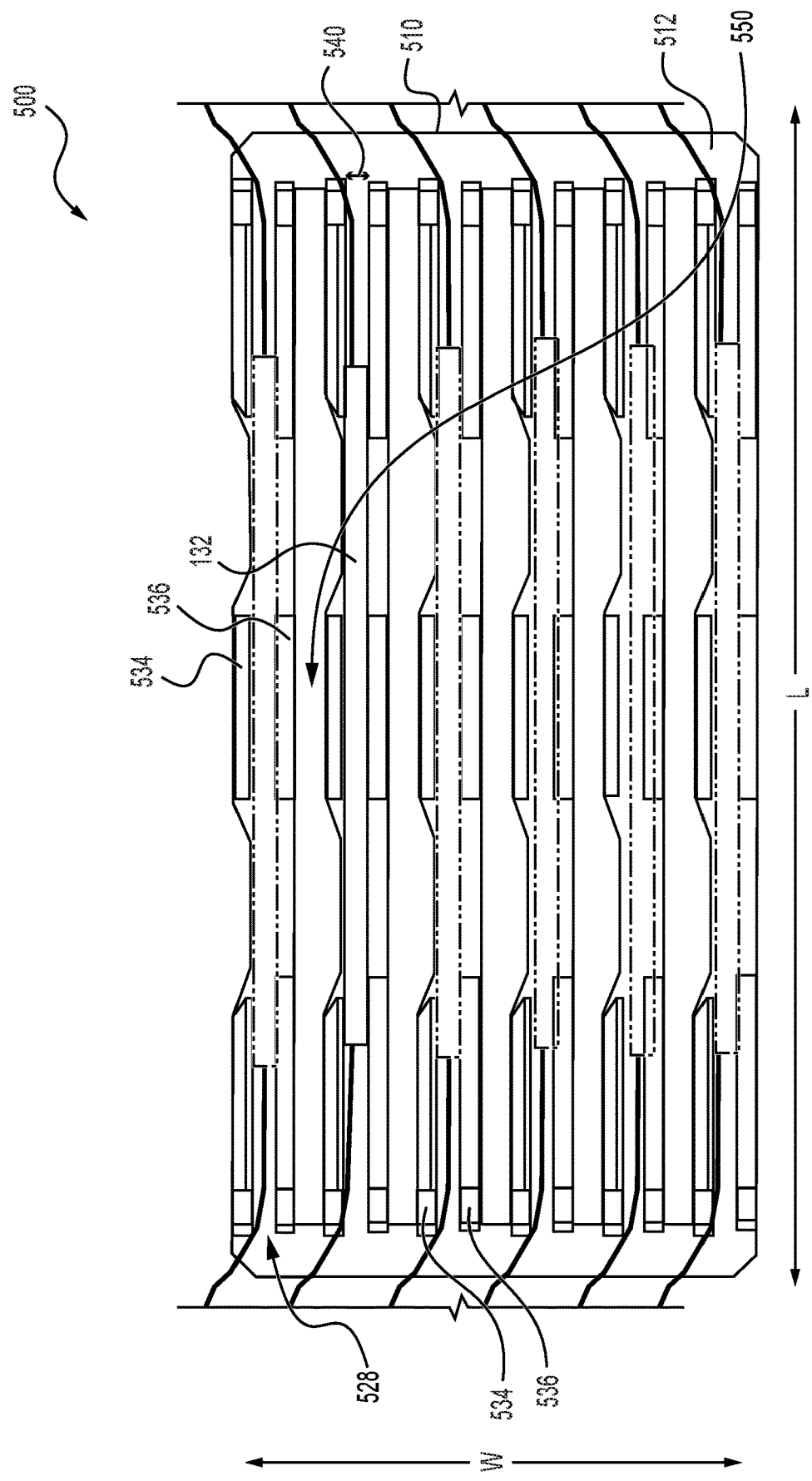
FIG. 5B illustrates a top view of a fiber splice holder adapter of FIG. 5B.

Referring now to FIGS. 5A and 5B, an exemplary fiber splice holder adapter 500 includes a base portion 510 and a holding portion 520 extending from a top surface 512 of the base portion 510. The holding portion 520 is configured to hold a first type of fiber splice protector 132, for example, a mechanical crimp splice protector. In some aspects, the base portion 510 may comprise a substantially planar structure having a length L and a width W, and the top surface 512 may be a flat surface. As best illustrated in FIG. 5B, the base portion 510 includes a receiving feature 550, for example, an opening or slot, that is configured to couple the fiber splice holder adapter 500 with a fiber splice cassette 600.

The holding portion 520 may include a holding structure or biasing portion 522, for example, biasing portions 524, 526 configured to define a receiving portion 528. As illustrated, the biasing portions 524, 526 may comprise opposed wall portions spaced apart in the width direction W by a distance 540 that substantially matches a dimension of the fiber splice protector 132 such that the holding structure 522 is configured to hold the fiber splice protector 132 in an interference fit relationship. That is, the receiving portion 528 may have a width equal to the distance 540. In some aspects, the wall portions 524, 526 may have a degree of flexibility that permits the wall portions 524, 526 to move away from one another to receive a fiber splice protector having a dimension that is greater than the distance 540 between the wall portions 524, 526. A bias of the wall portions 524, 526 urges the wall portions 524, 526 toward one another to hold the fiber splice protector 132. In some aspects, free ends 534, 536 of the biasing portions 524, 526 may taper toward one another to facilitate or guide a fiber splice closure into the receiving portion 528.

It should be understood that either of both of the biasing portions 524, 526 may comprise one wall portion in the length direction L or a plurality of wall portions spaced apart in the length direction L. In the illustrated embodiment, the holding portion 520 may include a plurality of holding structures 522 arranged sequentially in the width direction W, and the base portion 510 may include a receiving feature 550 between each adjacent holding structure 522.

Referring now to FIGS. 6A and 6B, a heat shrink splice protector holder portion 602 of a fiber splice cassette 600 (FIG. 9) includes a base portion 610 and a holding portion 620 extending from a top surface 612 of the base portion 610. The holding portion 620 is configured to hold a second type of fiber splice protector 130, for example, a heat shrink splice protector. In some aspects, the base portion 610 may comprise a substantially planar structure having a length L1 and a width W1, and the top surface 612 may be a flat surface. Referring again to FIG. 5B, the receiving feature 550 of the base portion 510 is configured to receive the holding portion 620 of the fiber splice cassette 600. The fiber splice cassette 600 and heat shrink splice protector holder portion 602, including the base portion 610 and the holding portion 620, comprise a single, monolithic structure of unitary construction.

The holding portion 620 may include a holding structure 622, for example, wall portion 625 and biasing portions 624, 626 configured to define a receiving portion 628. As illustrated, the each of the biasing portions 624, 626 may comprise a straight wall portion 634, 636 and a curved wall portion 644, 646. In the illustrated embodiment, the holding structure 622 includes adjacent holding structures spaced apart in the width direction W by a distance 640 that substantially matches a dimension of the fiber splice protector 130 such that two adjacent holding structures 622 are configured to hold the fiber splice protector 130 in an interference fit relationship. That is, the receiving portion 628 may have a width equal to the distance 640. In some aspects, the curved wall portions 644, 646 may extend into the receiving portion 628 between adjacent holding structures 622 and may have a degree of flexibility that permits the wall portions 624, 626 to move away from the adjacent holding structure 622 to vary the size of the receiving portion 618. As a result, the receiving portion 628 is configured to receive different sized fiber splice protectors ranging in size from the distance 640 between adjacent wall portions 625 to a smaller distance 642 between free ends of the curved wall portions 644, 646 of one holding structure 622 and the straight wall portions 634, 636 of an adjacent holding structure 622. A bias of the biasing portions 624, 626 urges the curved wall portions 644, 646 of one holding structure 622 toward the straight wall portions 634, 636 of an adjacent holding structure 622 to hold the fiber splice protector 130.

Figure 7A:
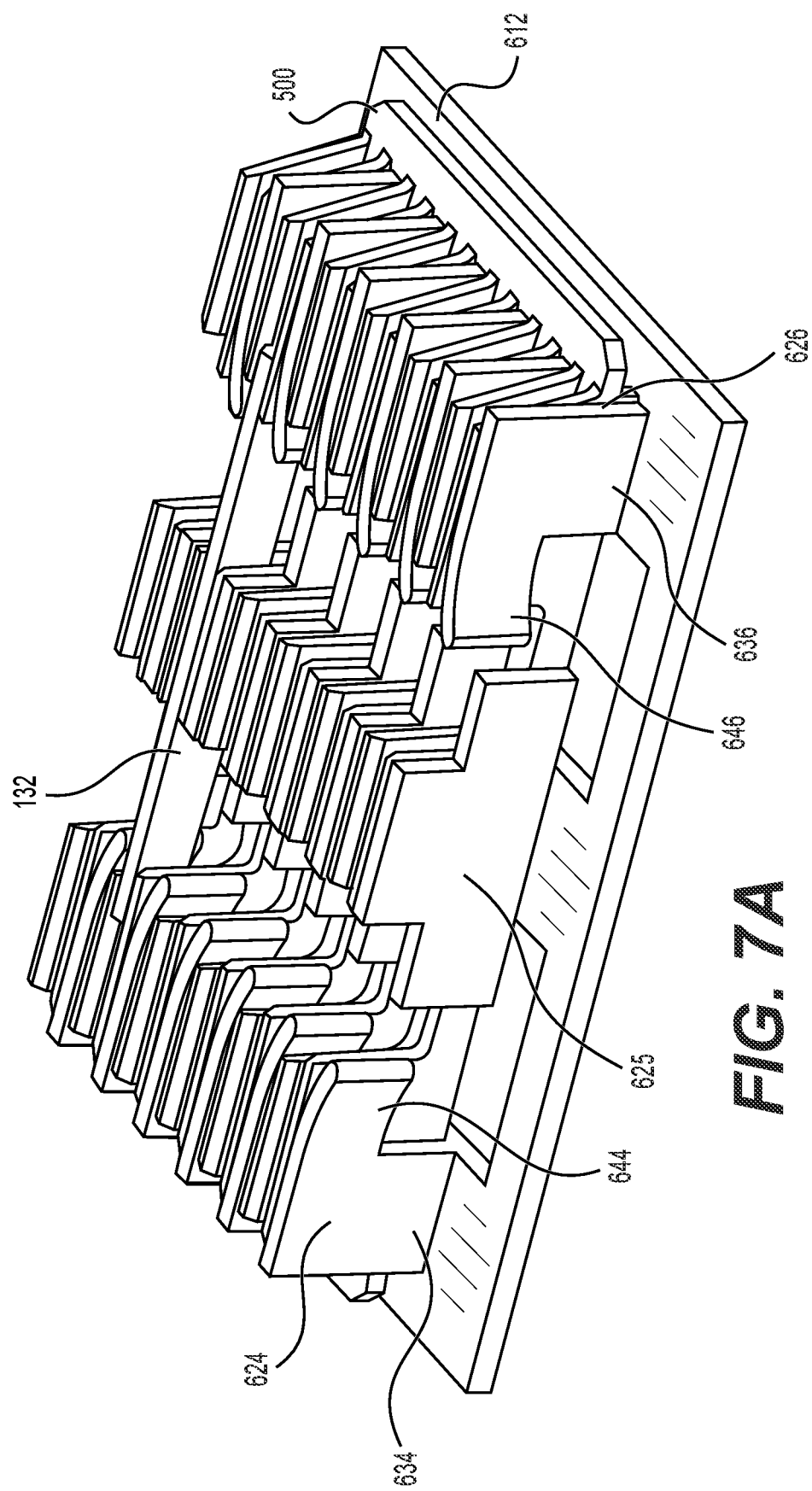
FIG. 7A illustrates a top perspective view of the exemplary fiber splice holder adapter of FIG. 5A coupled with the heat shrink splice protector holder portion of FIG. 6A.
Figure 7B:
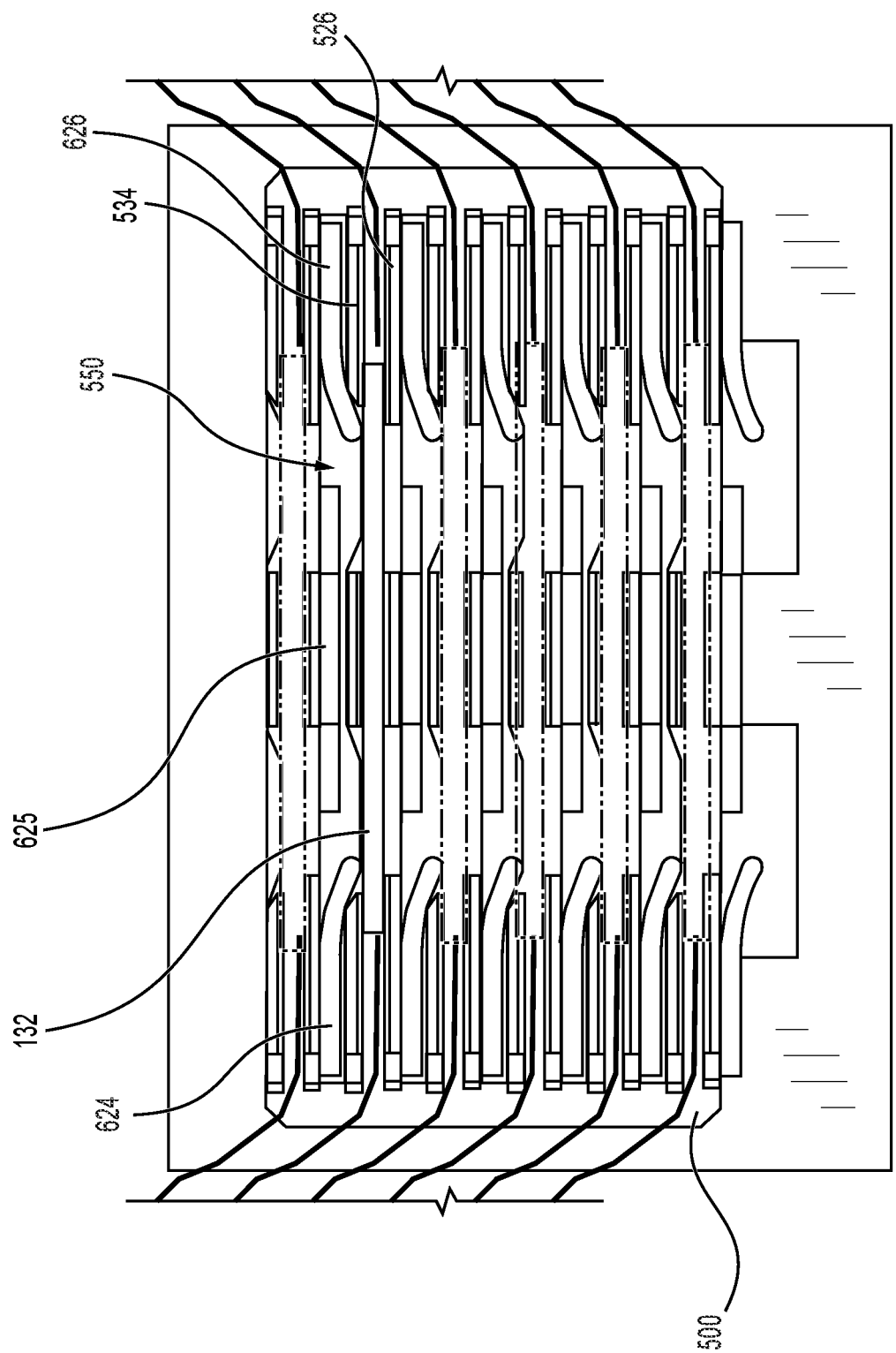
FIG. 7B illustrates a top perspective view of the exemplary fiber splice holder adapter of FIG. 5A coupled with the heat shrink splice protector holder portion of FIG. 6A.
Figure 8:
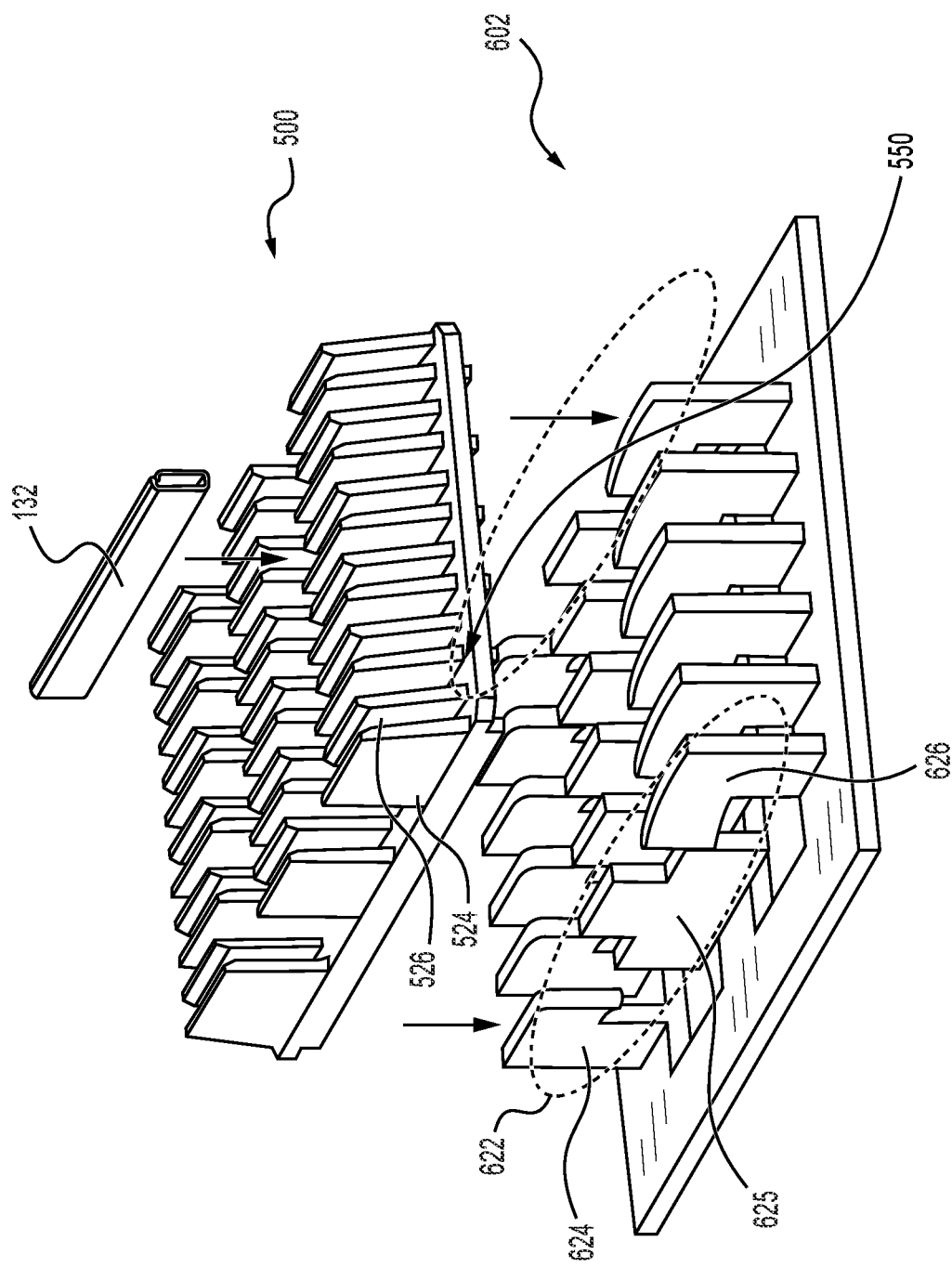
FIG. 8 is an exploded perspective view of the exemplary fiber splice holder adapter of FIG. 5A coupled with the heat shrink splice protector holder portion of FIG. 6A.

As shown in FIGS. 7A, 7B, and 8, the receiving feature 550 of the base portion 510 is configured to receive the holding portion 620 of the fiber splice cassette 600. For example, as best shown in FIG. 7B, the receiving feature 550 receives a wall portion 625, and biasing portions 624, 626 that are aligned in the length direction L1 of the holding portion 620. After the receiving feature 550 of the base portion 510 receives the holding portion 620 of the fiber splice cassette 600 to couple the adapter 500 with the holding portion 620, the holding structure 522 continues to define the receiving portion 528 having a distance 540 between the biasing portions 524, 526 in the width direction W by a distance 540 that substantially matches a dimension of the fiber splice protector 132. As illustrated, the distance 540 is less that the distance 642 between free ends of the curved wall portions 644, 646 of one holding structure 622 and the straight wall portions 634, 636 of an adjacent holding structure 622.

Figure 9:
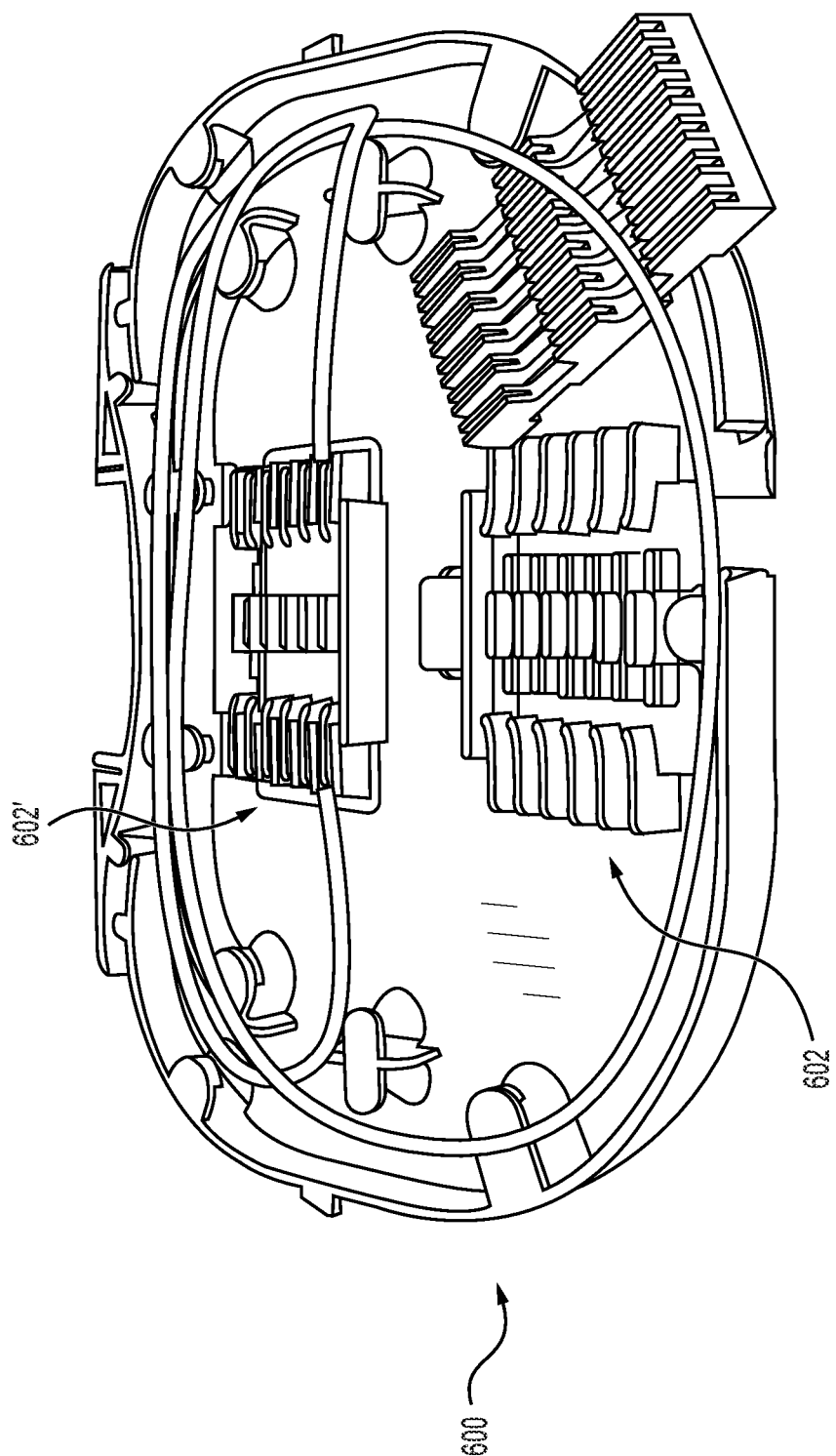
FIG. 9 is a top perspective view of an exemplary fiber splice cassette with the exemplary fiber splice holder adapter of FIG. 5A coupled with the heat shrink splice protector holder portion of FIG. 6A.

In use, the variable width of the receiving portion 628, from width 640 and width 642, is greater than a width of the first type of fiber splice protector 132, for example, a mechanical crimp splice protector, such that the receiving portion 628 is not able to hold the first type of fiber splice protector 132 in an interference fit relationship. As shown in FIG. 9, after the receiving feature 550 of the base portion 510 receives the holding portion 620 of the fiber splice cassette 600 to couple the adapter 500 with the holding portion 620, the adapter 100 converts the heat shrink splice protector holder portion 602 of the fiber splice cassette 600 to a splice protector holder portion 602' that is configured to hold the first type of fiber splice protector 132, for example, a mechanical crimp splice protector.

While example embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An adapter configured to permit a heat shrink splice holder portion of a fiber splice cassette to hold a mechanical crimp splice protector comprising:
    a base portion;
    a holding portion configured to extend from a top surface of the base portion;
    wherein the holding portion is configured to hold a mechanical crimp splice protector;
    wherein the holding portion includes a biasing portion configured to define a receiving portion;
    wherein the receiving portion is configured to receive a mechanical crimp splice protector;
    wherein the biasing portion is configured to hold a mechanical crimp splice protector in an interference fit;
    wherein the biasing portion is configured to include opposed wall portions that are biased toward one another to hold a fiber splice protector there between;
    wherein the base portion is configured to include a receiving feature that is configured to couple the adapter with a fiber splice cassette;
    wherein the receiving feature is configured to receive a holding portion of a fiber splice protector holder that is configured to hold a heat shrink splice protector; and
    wherein the receiving feature is configured to couple the adapter with a heat shrink splice holder portion of a fiber splice cassette that is unable to hold a mechanical crimp splice protector in an interference fit so as to convert the heat shrink splice protector holder portion to a mechanical crimp splice protector holder portion such that the fiber splice cassette is configured to hold a mechanical crimp splice protector in an interference fit.

2. The adapter of claim 1, wherein the receiving feature comprises an opening through the base portion.

3. The adapter of claim 1, wherein the receiving feature is configured to receive a holding portion of a fiber splice protector holder that is monolithically formed with a fiber splice cassette.

4. An assembly configured to permit a heat shrink splice holder portion of a fiber splice cassette to hold a mechanical crimp splice protector comprising:
    the adapter of claim 1;
    a fiber splice cassette configured to include a monolithically formed fiber splice protector holder; and
    wherein the receiving feature of the adapter is configured to receive a holding portion of the fiber splice protector holder to couple the adapter with the fiber splice cassette.

5. The assembly of claim 4, wherein the monolithically formed fiber splice protector holder comprises a heat shrink splice protector holder portion of the fiber splice cassette.

6. An adapter configured to permit a heat shrink splice holder portion of a fiber splice cassette to hold a mechanical crimp splice protector comprising:
    a base portion;
    a holding portion configured to extend from the base portion;
    wherein the holding portion includes a biasing portion configured to hold a first splice protector;
    wherein the base portion is configured to include a receiving feature that is configured to couple the adapter with a fiber splice cassette;
    wherein the receiving feature is configured to receive a holding portion of a fiber splice protector holder that is configured to hold a second splice protector that is different from the first splice protector; and
    wherein the receiving feature is configured to couple the adapter with a splice protector holder portion of a fiber splice cassette that is unable to hold the first splice protector so as to convert the splice protector holder portion to a splice protector holder portion that is configured to hold the first splice protector.

7. The adapter of claim 6, wherein the receiving feature is configured to couple the adapter with a splice protector holder portion of a fiber splice cassette that is unable to hold the first splice protector in an interference fit so as to convert the splice protector holder portion to a splice protector holder portion that is configured to hold the first splice protector in an interference fit.

8. The adapter of claim 6, wherein the receiving feature comprises an opening through the base portion.

9. The adapter of claim 6, wherein the receiving feature is configured to receive a holding portion of a fiber splice protector holder that is monolithically formed with a fiber splice cassette.

10. The adapter of claim 6, wherein the biasing portion is configured to define a receiving portion that is configured to receive a mechanical crimp splice protector.

11. The adapter of claim 6, wherein the biasing portion is configured to hold a mechanical crimp splice protector in an interference fit.

12. The adapter of claim 6, wherein the biasing portion is configured to include opposed wall portions that are biased toward one another to hold a fiber splice protector there between.

13. An assembly configured to permit a heat shrink splice holder portion of a fiber splice cassette to hold a mechanical crimp splice protector comprising:
the adapter of claim 6;
a fiber splice cassette configured to include a fiber splice protector holder; and
wherein the receiving feature of the adapter is configured to receive a holding portion of the fiber splice protector holder to couple the adapter with the fiber splice cassette.

14. The assembly of claim 13, wherein the fiber splice protector holder comprises a heat shrink splice protector holder portion monolithically formed with the fiber splice cassette.

15. An adapter configured to permit a heat shrink splice holder portion of a fiber splice cassette to hold a mechanical crimp splice protector comprising:
a base portion;
a holding portion configured to extend from the base portion;
wherein the holding portion is configured to hold a first splice protector;
wherein the base portion is configured to include a receiving feature that is configured to couple the adapter with a fiber splice cassette; and
wherein the receiving feature is configured to couple the adapter with a splice protector holder portion of a fiber splice cassette that is unable to hold the first splice protector so as to convert the splice protector holder portion to a splice protector holder portion that is configured to hold the first splice protector.

16. The adapter of claim 15, wherein the receiving feature is configured to couple the adapter with a splice protector holder portion of a fiber splice cassette that is unable to hold the first splice protector in an interference fit so as to convert the splice protector holder portion to a splice protector holder portion that is configured to hold the first splice protector in an interference fit.

17. The adapter of claim 15, wherein the receiving feature comprises an opening through the base portion.

18. The adapter of claim 15, wherein the receiving feature is configured to receive a holding portion of a fiber splice protector holder that is monolithically formed with a fiber splice cassette.

19. The adapter of claim 15, wherein the holding portion is configured to define a receiving portion that is configured to receive a mechanical crimp splice protector.

20. The adapter of claim 15, wherein the holding portion is configured to hold a mechanical crimp splice protector in an interference fit.

21. The adapter of claim 15, wherein the holding portion is configured to include opposed wall portions that are biased toward one another to hold a fiber splice protector there between.

22. An assembly configured to permit a heat shrink splice holder portion of a fiber splice cassette to hold a mechanical crimp splice protector comprising:
the adapter of claim 15;
a fiber splice cassette configured to include a fiber splice protector holder; and
wherein the receiving feature of the adapter is configured to receive a holding portion of the fiber splice protector holder to couple the adapter with the fiber splice cassette.

23. The assembly of claim 22, wherein the fiber splice protector holder comprises a heat shrink splice protector holder portion monolithically formed with the fiber splice cassette.

\* \* \* \* \*